(12) United States Patent
Choo et al.

(10) Patent No.: US 8,639,093 B2
(45) Date of Patent: Jan. 28, 2014

(54) APPARATUS AND METHOD FOR RECORDING PARTIAL ENCRYPTION OF BROADCAST PROGRAM

(75) Inventors: Hyon-Gon Choo, Daejeon (KR); Sang-Kwon Shin, Daejeon (KR); Sangwoo Ahn, Daejeon (KR); Jooyoung Lee, Seoul (KR); Jeho Nam, Daejeon (KR); Kyeongok Kang, Daejeon (KR); Jin-Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 283 days.

(21) Appl. No.: 12/893,448

(22) Filed: Sep. 29, 2010

(65) Prior Publication Data

US 2011/0103771 A1    May 5, 2011

(30) Foreign Application Priority Data

Nov. 4, 2009   (KR) .................. 10-2009-0105972

(51) Int. Cl.
| | |
|---|---|
| H04N 9/80 | (2006.01) |
| H04N 5/44 | (2011.01) |
| H04N 7/16 | (2011.01) |
| H04N 7/167 | (2011.01) |
| H04N 7/173 | (2011.01) |
| H04K 1/06 | (2006.01) |
| G06F 11/30 | (2006.01) |

(52) U.S. Cl.
USPC ............. 386/259; 348/734; 380/37; 713/193; 725/31; 725/110; 725/133

(58) Field of Classification Search
USPC ............... 386/259; 348/734, E5.096; 380/37; 713/193; 725/31, 110, 133
See application file for complete search history.

(56) References Cited

U.S. PATENT DOCUMENTS

| | | | |
|---|---|---|---|
| 7,787,622 B2 * | 8/2010 | Sprunk ........................ | 380/37 |
| 2010/0064333 A1 * | 3/2010 | Blackburn et al. ........... | 725/110 |

FOREIGN PATENT DOCUMENTS

| | | |
|---|---|---|
| JP | 11-261965 | 9/1999 |
| JP | 2001-45432 | 2/2001 |
| KR | 1020090016282 | 2/2009 |

* cited by examiner

*Primary Examiner* — Thai Tran
*Assistant Examiner* — Syed Hasan
(74) *Attorney, Agent, or Firm* — Nelson Mullins Riley & Scarborough LLP

(57) ABSTRACT

An apparatus for encrypting and recording a broadcasting program includes a packet input unit configured to receive packets of a broadcasting program to be recorded and sequentially output the packets, an encryption selector configured to receive the packets sequentially output from the packet input unit, selectively output the received packets to a first path and to a second path, wherein packets to be encrypted are output to the first path and packets not to be encrypted are output to the second path, an encryption processor configured to encrypt the packets output to the first path based on a predetermined encryption method, and a storing unit configured to store the encrypted packets from the encryption processor or store the packets output to the second path.

20 Claims, 4 Drawing Sheets

APPARATUS AND METHOD FOR RECORDING PARTIAL ENCRYPTION OF BROADCAST PROGRAM

CROSS-REFERENCE TO RELATED APPLICATIONS

The present application claims priority of Korean Patent Application No. 10-2009-0105972, filed on Nov. 4, 2009, which is incorporated herein by reference in its entirety.

BACKGROUND OF THE INVENTION

1. Field of the Invention

Exemplary embodiments of the present invention relate to an apparatus and method for recording broadcasting programs; and, more particularly, to an apparatus and method for recording broadcasting programs using partial encryption.

2. Description of Related Art

Various apparatuses and methods have been introduced for recording broadcasting programs. Among them, a time shifting method and a personal video recorder (PVR) have been widely known. The time shifting method enables a user to record a predetermined broadcasting program in real time and watch the recorded broadcasting program in later. The personal video recorder (PVR) enables a user to record a predetermined broadcasting program at a desired time through reservation. Then, the user can playback the recorded program at any time using the PVR. These methods allow a user to record desired broadcasting programs without additional cost.

A cable broadcasting set top box (STB) employs a local scrambling encryption method for supporting a PVR function. However, a terrestrial broadcasting STB employs a different type of encryption method for supporting a PVR function.

FIG. 1 is a diagram showing an Advanced Television Systems Committee Common Scrambling Algorithm (ATSC CSA) defined as an encryption method in an ATSC standard.

As shown in FIG. 1, the ATSC standard defines a TS packet based encryption method. Particularly, the ATSC CSA of FIG. 1 introduces a block based encryption method that encrypts only predetermined parts of TS packet except a headers and adaptation field. The other encryption methods also introduce a packet based encryption method similar to the encryption method shown in FIG. 1.

The ATSC CSA of FIG. 1 does not cause any technical problems when a personal video recorder (PVR) function is supported through an individual encryption module using a smart card or when a chipset supports a PVR function. However, when a PVR function is used through the same processor equipped in a set-top box (STB) or in a TV set, the ATSC CSA may cause the following problems. For example, in case of a STB having a 300 MIPS (million instructions per second) processor, a processing power of 150 to 200 MIPS is required for encrypting a high definition (HD) broadcasting program. Accordingly, a packet loss problem may occur during encryption when a user wants to watch and record the HD broadcasting program at the same time.

In order to reduce a processing amount of encryption, a partial encryption method was introduced as shown in FIG. 2. As the partial encryption method, various methods have been also introduced such as a partial encryption method for selectively encoding AC components and DC components of a predetermined broadcasting program, a partial encryption method for encoding a header of video components, a motion vector (MV) and a variable length code, a macro block based scrambling encryption method, and a 8×8 block based scrambling encryption method.

However, these partial encryption methods require decoder level analysis, not packet level analysis. Accordingly, the partial encryption methods have to select a range of blocks or packets to be encrypted. This is such a drawback of the partial encryption method.

Further, the partial encryption method is not compatible with a scrambling/encryption standard method defined in a broadcasting standard. Therefore, a device employing the typical partial encryption method cannot be compatible with other devices.

Moreover, the typical partial encryption method was designed to properly work only in an environment guaranteeing a certain level of encryption performance. Accordingly, an encryption process may be interrupted when the certain level encryption performance is disturbed by outputting images for a user, inputting/outputting data into/from a hard disk, and interruptions from an external device. As a result, encrypted or stored packets may be lost.

SUMMARY OF THE INVENTION

An embodiment of the present invention is directed to a recording apparatus and method compatible with a scrambling/encrypting standard defined in an existing broadcasting standard.

Another embodiment of the present invention is directed to a recording apparatus and method for storing encrypted packets without loss when a broadcasting program is encrypted and recorded in real time.

Another embodiment of the present invention is directed to a recording apparatus and method that controls an encryption level.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for recording a broadcasting program by encrypting the broadcasting program includes a packet input unit configured to receive packets of a broadcasting program to be recorded and sequentially output the packets, an encryption selector configured to receive the packets sequentially output from the packet input unit, selectively output the received packets to a first path and to a second path, wherein packets to be encrypted are output to the first path and packets not to be encrypted are output to the second path, an encryption processor configured to encrypt the packets output to the first path based on a predetermined encryption method, and a storing unit configured to store the encrypted packets from the encryption processor or store the packets output to the second path.

In accordance with another embodiment of the present invention, a method for encrypting and recording a broadcasting program includes receiving packets of a broadcasting program to be recorded, selectively outputting packets to be encrypted to a first path and packets not to be encrypted to a second path, encrypting the packets output to the first path based on a predetermined encryption method, and storing the encrypted packets and storing the packets output to the second path.

DESCRIPTION OF SPECIFIC EMBODIMENTS

Figure 1:
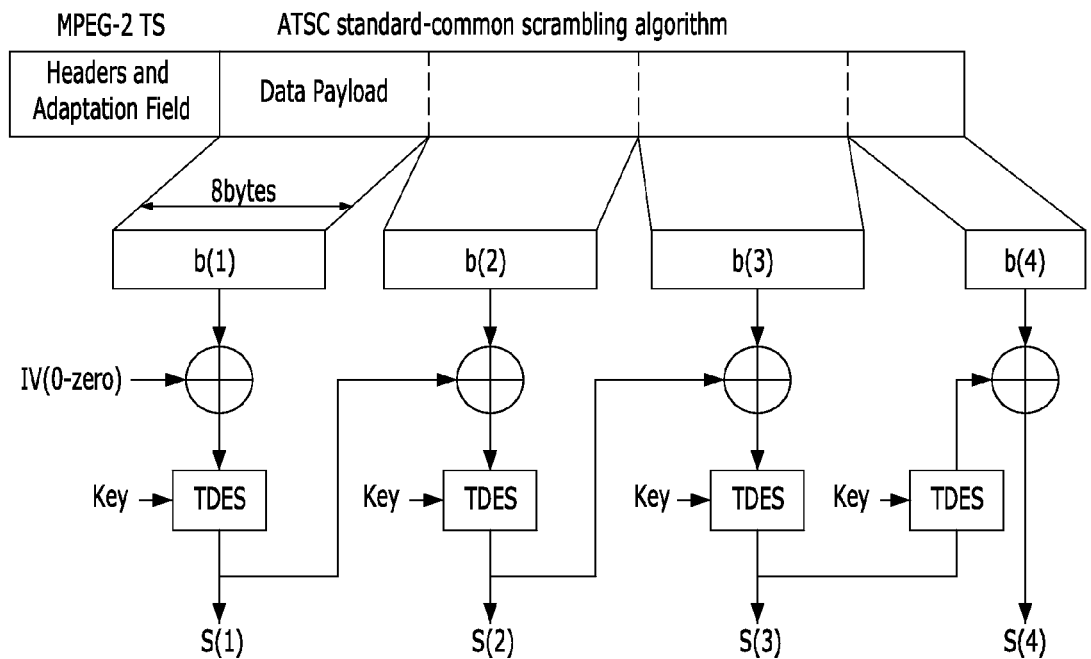
FIG. 1 is a diagram showing an Advanced Television Systems Committee Common Scrambling Algorithm (ATSC CSA) defined in an ATSC standard.
Figure 2:
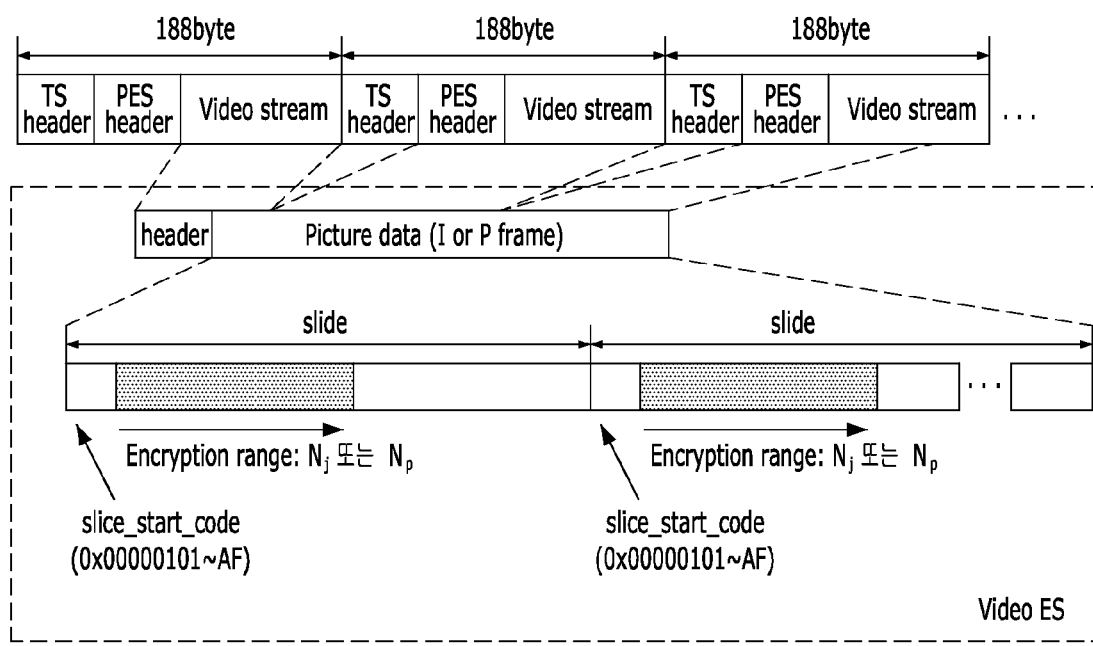
FIG. 2 is a diagram illustrating a typical partial encryption method.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 3:
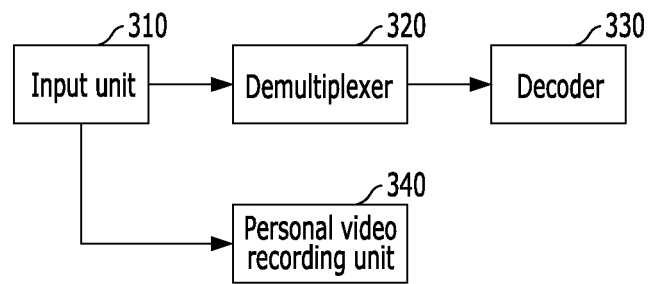
FIG. 3 is a block diagram illustrating a personal video recording apparatus in accordance with an embodiment of the present invention.

FIG. 3 is a block diagram illustrating a personal video recording (PVR) apparatus for recording a broadcasting program in accordance with an embodiment of the present invention.

Referring to FIG. 3, the PVR apparatus in accordance with the embodiment of the present invention includes an input unit 310, a demultiplexer 320, a decoder 330, and a personal video recording (PVR) unit 340.

The input unit 310 is a module for receiving a broadcasting signal. For example, the input unit 310 may be a tuner in a TV set or a set top box (STB).

The demultiplexer 320 separates the received broadcasting signal into audio, video, and data. Then, the demultiplexer 320 outputs the separated information to the decoder 340.

The decoder 330 receives the information from the demultiplexer 320, decodes the information to a displayable signal, and outputs the displayable signal to an output unit (not shown).

When a user selects recording a predetermined broadcasting program, the personal video recording (PVR) unit 340 receives the predetermined broadcasting program through the input unit 310, performs a partial encryption on the received broadcasting program, and stores the partial encrypted broadcasting program in a file format. Hereinafter, the personal video recording (PVR) unit 340 will be described in detail with reference to the accompanying drawings.

Figure 4:
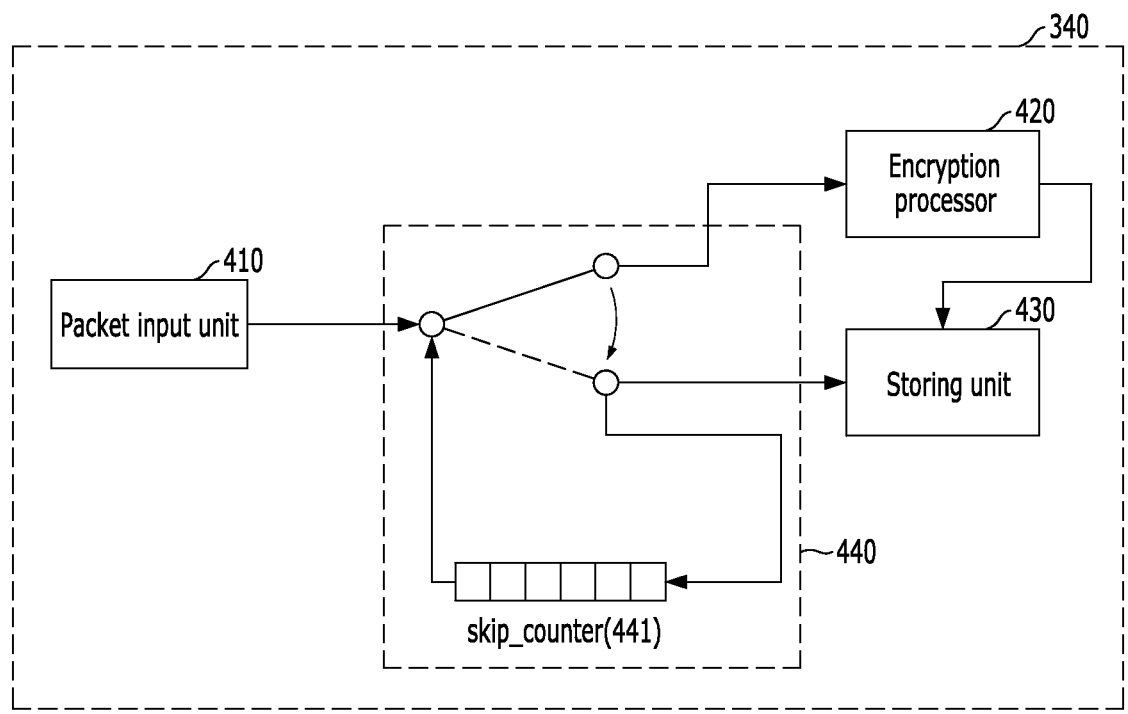
FIG. 4 is a block diagram illustrating a personal video recording unit in accordance with an embodiment of the present invention.

FIG. 4 is a block diagram illustrating a personal video recording (PVR) unit 340 of FIG. 3 in accordance with an embodiment of the present invention.

As shown in FIG. 4, the personal video recording unit 340 includes a packet input unit 410, an encryption processor 420, a storing unit 430, and an encryption selector 440.

The packet input unit 410 receives packets of a target broadcasting program to be recorded. Then, the packet input unit 410 sequentially outputs the received packets to the encryption selector 440.

The encryption selector 440 classifies the packets into a packet to be encrypted and a packet not to be encrypted. Then, the encryption selector 440 outputs packets to be encrypted to the encryption processor 420 through a first path. Hereinafter, a packet to be encrypted is referred to as "a target packet". The encryption selector 440 also outputs packets not to be encrypted to the storing unit 430 through a second path. Hereinafter, a packet not to be encrypted is referred to as "a bypass packet".

The encryption processor 420 encrypts the target packets, which are input through the first path, based on an encryption/scrambling standard. For example, when the target packet is a MPEG-2 Transport Stream (TS) packet, a "transport_scrambling_control" field in a header is marked with a value other than '00' in order to indicate that a corresponding packet is an encrypted packet. Accordingly, any additional information is not required for partial encryption. Such a marking method also enables the partial encryption method to be compatible with an existing broadcasting program.

The storing unit 430 arranges and stores the packets from the packet input unit 410 and the encryption processor 420 in a predetermined order. The storing unit 430 may be embodied as one module with the packet input unit 410.

As show in FIG. 4, the encryption selector 440 may be embodied using a skip counter 441.

The skip counter 441 counts the number of bypass packets which are directly transferred to the storing unit 430 through the second path. The skip counter 441 has a predetermined counter length. The counter length of the skip counter 441 may be calculated based on Equation 1 below.

$$C_L + 1 \times PI_S + \alpha > PE_{PS} \qquad \text{Eq. 1}$$

In Equation 1, $C_L$ denotes a counter length of the skip counter 441, $PI_S$ indicates a speed of input packet, and $PE_{SP}$ is a speed of processing packet encryption. That is, $PE_{SP}$ denotes a speed of encrypting input packets in the encryption processing unit 420. $\alpha$ is a constant denoting margin for processing time difference.

For convenience, the skip counter 441 of FIG. 4 is illustrated to have a counter length of 6. Hereinafter, the operation of the personal video recording unit 340 of FIG. 4 will be described.

At first, the counter length of the skip counter 441 is decided using Equation 1. Then, the skip counter 441 is reset. Accordingly, a counter coefficient of the skip counter 441 becomes 0.

The packet input unit 410 sequentially outputs packets of a target broadcasting program to the encryption selector 440.

The encryption selector 440 receives packets sequentially output from the packet input unit 410. The encryption selector 440 determines whether each input packet is a target packet to be encrypted or not. The encryption selector 440 may use a start point of a video header or an audio header in consideration of encryption efficiency to decide a target packet to encrypt. For example, the encryptions selector 440 uses a start point "00 00 00" of each sequence to decide a packet to encrypt in case of MPEG-2.

When an input packet is a target packet to be encrypted, the encryption selector 440 outputs the target packet through a first path. The encryption processor 420 encrypts the packet received through the first path from the encryption selector 440 based on a previously decided encryption/scrambling method. The encryption processor 420 outputs the encrypted packet to the storing unit 430.

The encryption selector 440 does not output next packets followed by the target packet through the first path. The encryption selector 440 output the next packets followed by the target packet through the second path. The next packets outputted through the second path are stored in the storing unit 430 without encryption. When the packets are output to the second path, the skip counter 441 counts the number of the packets output to the second path.

When the number of packets output to the second path reaches to 6, the skip counter 441 cannot count the number of packets anymore due to overflow. In this case, the encryption selector 440 outputs a next input packet to the first path. Here, the next input packet is followed by a packet that increases the count coefficient of the skip counter 441 to 6. Then, the skip counter 441 is reset.

After resetting the skip counter 441, the encryption selector 440 outputs next packets followed by the encrypted packet to the second path as many as a counter length of the skip counter 441. When the skip counter 441 overflows, the encryption selector 440 outputs a next input packet to the first path again.

The above operation is repeatedly performed until no packet is received.

That is, the encryption processor 420 in accordance with the embodiment of the present invention repeatedly performs encrypting one packet, storing the encrypted packet in the storing unit 430, and directly storing the next six packets at the storing unit 430 without encryption.

Figure 5:
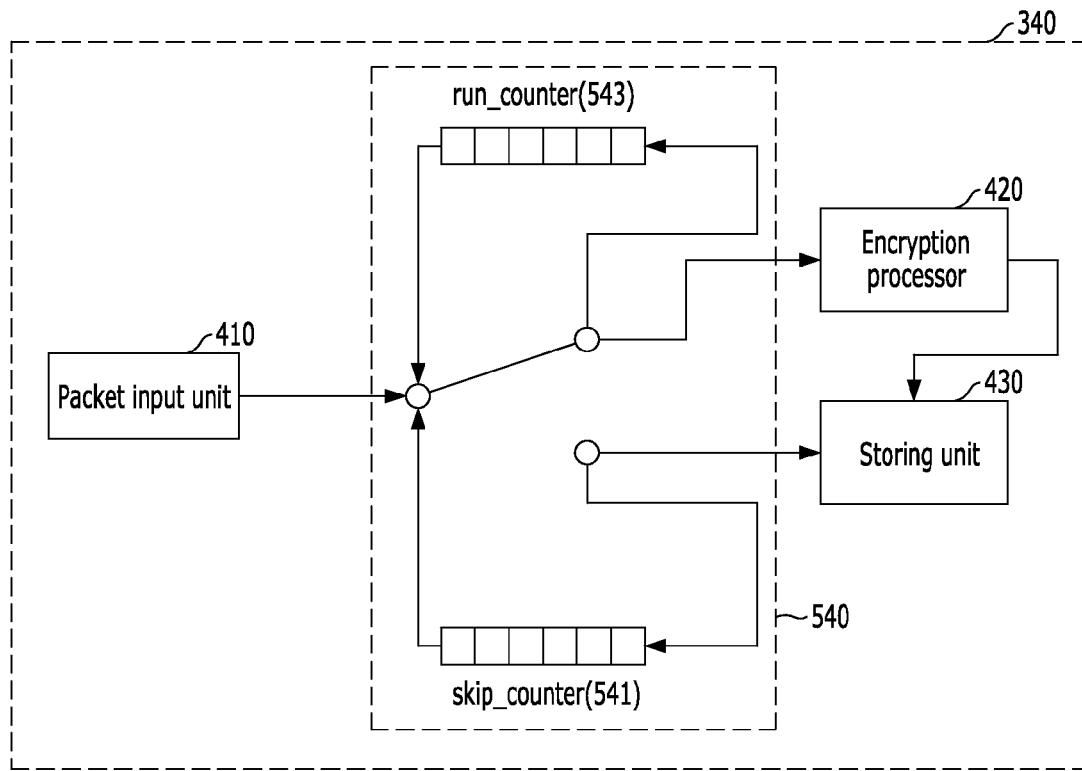
FIG. 5 is a block diagram illustrating a personal video recording unit in accordance with another embodiment of the present invention.

FIG. 5 is a block diagram illustrating a personal video recording (PVR) unit 340 in accordance with another embodiment of the present invention.

Referring to FIG. 5, the personal video recording (PVR) unit 340 in accordance with another embodiment of the present invention additionally includes a run counter 543 in an encryption selector 540 unlike the encryption selector 340 of FIG. 4.

The run counter 543 counts the number of packets input to the encryption processor 420 through the first path. Like a skip counter 541, the run counter 543 has a predetermined counter length. The counter length of the run counter 543 is calculated by using Equation 2 below.

$$(SC_L + RC_L) \times PI_S + \alpha > (PE_{PS} \times RC_L)$$ Eq. 2

In Equation 2, $SC_L$ denotes a counter length of the skip counter 541 and $PI_S$ indicates a speed of packet inputting to the encryption selector 540. That is, $PE_{SP}$ denotes a speed of encrypting input packets in the encryption processing unit 420. $\alpha$ is a constant denoting margin for processing time difference.

In FIG. 5, the skip counter 541 and the run counter 543 are illustrated to have a counter length of 6.

When packets are transferred from the packet input unit 410 to the encryption processor 420, the encryption selector 540 of the personal video recording unit 540 shown in FIG. 5 increases a count coefficient of the run counter 543. Also, the encryption selector 540 increases a count coefficient of the skip counter 541 when the packets from the packet input unit 410 are directly stored in the storing unit 430. The encryption selector 540 decides a direction of transferring the next packet according to the overflow state of the skip counter 541 and the run counter 543. Hereinafter, the operation of the encryption selector 540 will be described in more detail.

At first, the counter lengths of the skip counter 541 and the run counter 543 are previously decided using Equation 2.

Then, the encryption selector 540 resets the run counter 543 and the skip counter 541 and receives packets sequentially from the packet input unit 410.

If the first input packet is a target packet to be encrypted, the encryption selector 540 outputs the packet to a first path and increases the count coefficient of the run counter 543 from 0 to 1.

The encryption selector 540 outputs next input packets to the first path until the run counter 543 overflows. That is, the encryption selector 540 outputs next input packet to the first path until the number of packets outputted to the first path reaches to 6.

When the number of packets outputted to the first path reaches to 6, the encryption selector 540 outputs next input packets to the second path. Then, the encryption selector 540 resets the run counter 543. Meanwhile, the skip counter 541 counts the number of packets outputted to the second path.

When the number of packets outputted to the second path reaches to the counter length of the skip counter 541, the encryption selector 540 outputs next input packets to the first path and resets the skip counter 541.

The above operation is repeatedly performed until no packet is received.

That is, the encryption processor 420 of FIG. 5 repeatedly performs encrypting six packets corresponding to the counter length of the run counter 543, storing the six encrypted packets at the storing unit 430, and directly storing next six input packets in the storing unit 430 without encryption.

Figure 6:
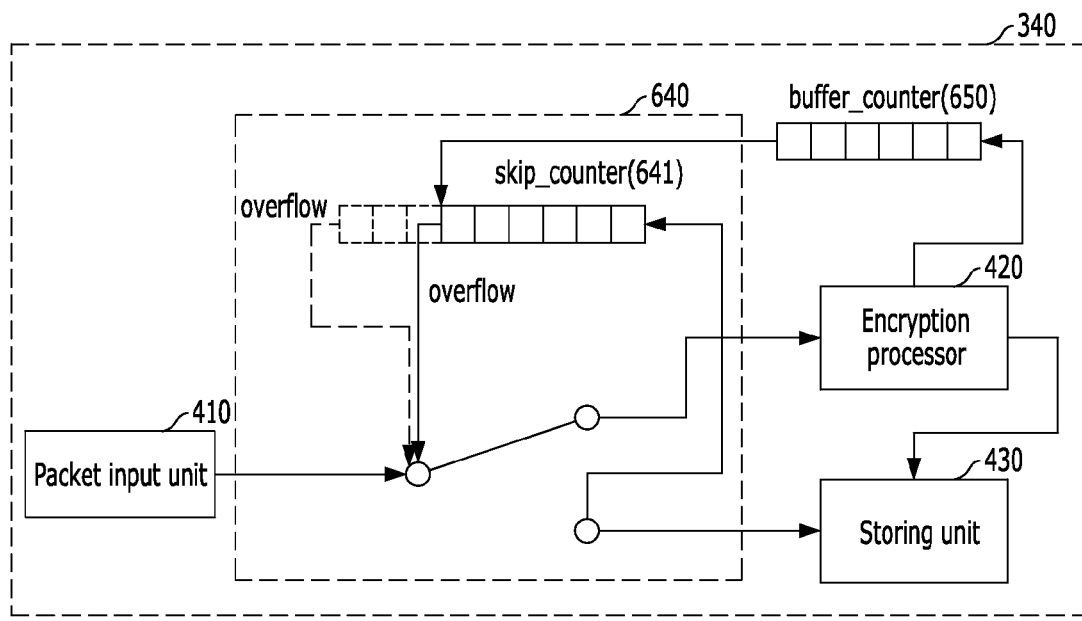
FIG. 6 is a block diagram illustrating a personal video recording unit in accordance with still another embodiment of the present invention.

FIG. 6 is a block diagram illustrating a personal video recording (PVR) unit 340 in accordance with another embodiment of the present invention.

When a personal video recording (PVR) unit is embodied in a STB with a single processor, a processing speed of a CPU may be influenced by user input or hard disk usage. The personal video recording unit 340 of FIG. 6 may provide improvements although the personal video recording unit 340 of FIG. 6 is embodied in a STB with a single processor.

The personal video recording (PVR) unit 340 of FIG. 6 additionally includes a buffer counter 650 unlike the personal video recording unit 340 of FIG. 4.

The buffer counter 650 counts the number of packets stored in an input buffer before the packets are encrypted by the encryption processor 420. That is, the buffer counter 650 increases a count according to the number of packets input to the input buffer of the encryption processor 430 through the first path. After the encrypted packets are transferred to the storing unit 430, the buffer counter 650 decreases the count as many as the number of packets transferred to the storing unit 430. The buffer counter 650 may be embodied using an up-down counter that counts increment or decrement.

A skip counter 641 of FIG. 6 has a variable counter length unlike the skip counter 441 of FIG. 4. The counter length of the skip counter 641 varies according to the buffer counter 650. Hereinafter, the operation thereof will be described in detail.

At first, a counter length of the buffer counter 650 is determined at first. The counter length may be decided according to a length of the input buffer of the encryption processor 420. Then, an upper threshold and a lower threshold of the buffer counter are decided. The upper threshold may be decided as a maximum counter length of the buffer counter. Then, a counter length of the skip counter 641 is also decided.

When a packet output from the packet input unit 410 is transferred to the encryption unit 420 through a first path, the transferred packet is temporally stored in the input buffer of the encryption processor 420. Here, the buffer counter 650 increases a count coefficient as much as a length of the input buffer. After the encryption processor 420 encrypts and transfers the input packet to the storing unit 430, the transferred packet is deleted from the input buffer. Here, the buffer counter 650 decreases the count coefficient as many as deleted packets.

When the counter length of the buffer counter 650 exceeds the upper threshold because of the delay in encryption process of the encryption processor 420, the buffer counter 650 informs the skip counter 641 that the buffer counter 650 overflows. The skip counter 641 increases the counter length as much as a predetermined length. When the counter length of the skip counter 641 increases as much as 2-bits, the amount of packets not to be encrypted can be increased four times.

After the delay in the encryption process is resolved, the counter length of the buffer counter 650 is reduced. When the reduction of the counter length becomes lower than the low threshold, the buffer counter 650 informs the skip counter 641 that the buffer counter 650 overflows. Then, the skip counter 641 decreases the counter length as much as the initial counter length.

That is, the personal video recording (PRV) unit 340 in accordance with another embodiment of FIG. 6 can dynamically control an encryption process according to an encryption process speed due to external input. Therefore, packet loss may be prevented.

Figure 7:
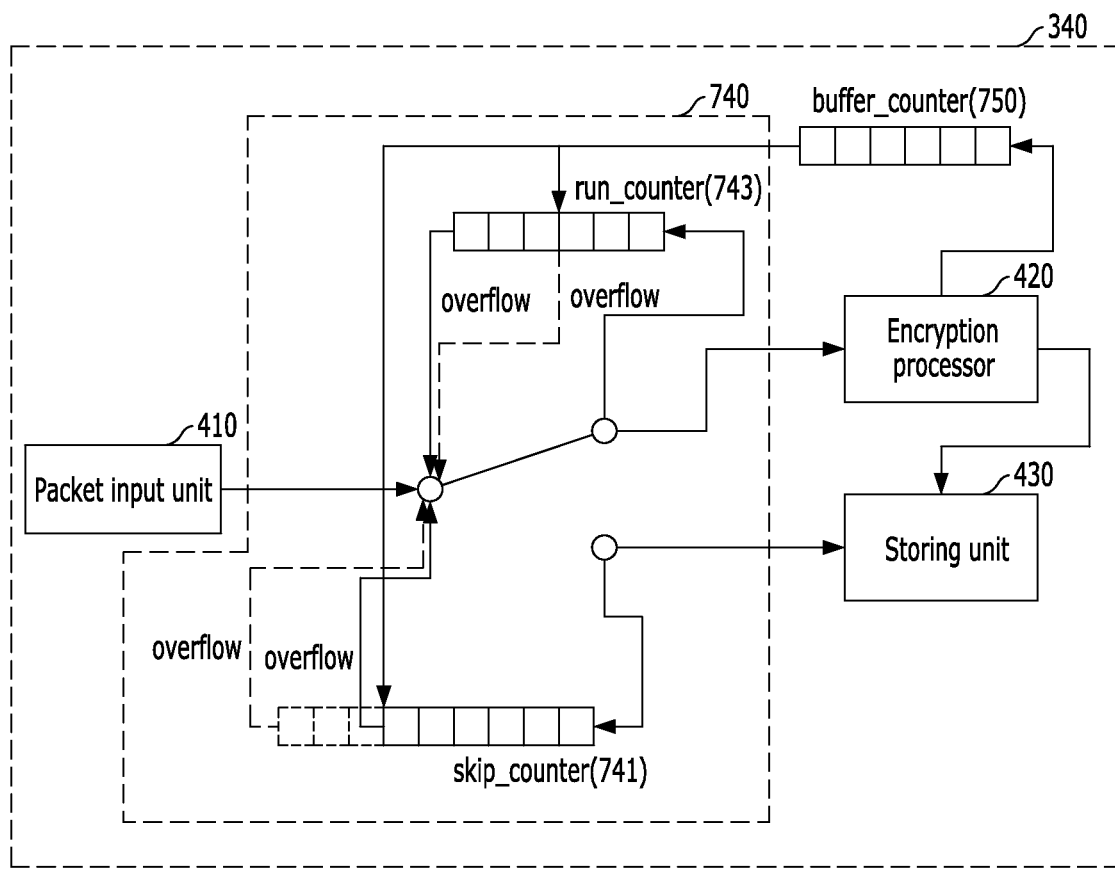
FIG. 7 is a block diagram illustrating a personal video recording unit in accordance with yet another embodiment of the present invention.

FIG. 7 is a block diagram illustrating a personal video recording (PVR) unit 340 in accordance with another embodiment of the present invention.

The personal video recording (PVR) unit 340 of FIG. 7 additionally includes a buffer counter 750 with the personal video recording unit 340 of FIG. 5. The buffer counter 750 is identical to that shown in FIG. 6. Therefore, the detail description thereof is omitted.

A skip counter 741 of FIG. 7 has a variable counter length unlike the skip counter 541 of FIG. 5. Further, a run counter 743 of FIG. 7 has a variable counter length unlike the run counter 543 of FIG. 5. The counter length of the skip counter 741 and the run counter 743 is controlled according to a buffer counter 750. Hereinafter, the operation thereof will be described in detail.

At first, the counter length of the buffer counter 750 is decided. Further, an upper threshold value and a lower threshold value are decided. Then, the counter lengths of the skip counter 741 and the run counter 743 are decided in advance.

When the encryption selector 740 receives a packet from the packet input unit 410, the encryption selector 740 determines whether the received packet is a target packet to be encrypted or not. If the received packet is the target packet to be encrypted, the encryption selector 640 outputs the packet to the first path. Then, the packet is input to the encryption processor 420 through the first path. The encryption processor 420 stores the packet to the input buffer.

If the counter length of the buffer counter 750 exceeds the upper threshold value due to delay in the encryption process of the encryption processor 420, the buffer counter 750 informs the skip counter 741 and the run counter 743 that the buffer counter 750 overflows.

Then, the counter length of the skip counter 741 increases as much as a predetermined length. Also, the counter length of the run counter 643 decreases as much as increments in the counter length of the skip counter 741.

After the delay in the encryption processor 420 is resolved, the counter length of the buffer counter 750 is decreased. However, if the counter length of the buffer counter 750 becomes lower than the lower threshold value after the counter length of the buffer counter 750 is continuously decreased, the buffer counter 750 informs the skip counter 741 and the run counter 743 that the buffer counter 750 overflows. Then, the counter lengths of the skip counter 741 and the run counter 743 are restored to the initial counter lengths.

That is, the personal video recording unit 340 of FIG. 7 has an additional advantage of properly responding to the encryption processing delay as well as the other advantages of the personal video recording unit 340 of FIG. 5.

Figure 8:
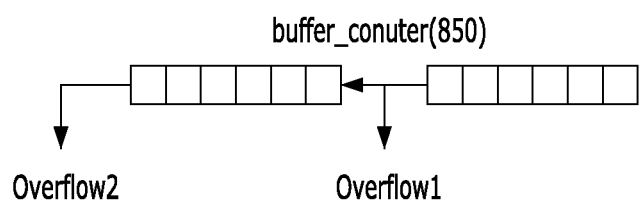
FIG. 8 is a diagram illustrating a buffer counter in accordance with an embodiment of the present invention.

FIG. 8 is a diagram illustrating a buffer counter 750 of FIG. 7.

The buffer counter 850 is illustrated as a double counter. However, a multiple counter may be used as the buffer counter 850.

When the buffer counter 850 is embodied as a double counter as shown in FIG. 8, the counter lengths of the skip counter 741 and the run counter 743 of FIG. 7 can be controlled. For example, when the buffer counter 850 has a first overflow state (overflow1) due to external delay, the counter length of the run counter 743 is decreased as much as a N length and the counter length of the skip counter 741 is increased as much as a N length. Further, when the buffer counter 850 has a second overflow state (overflow2) because the externally delay continuous, the counter length of the skip counter 741 is increased as much as a 2N length, and the counter length of the run counter 743 is decreased as much as a 2N length.

It is preferable that counter lengths of the skip counter 741 and the run counter 743 may be increased or decreased uniformly when a transmission bandwidth is constant like broadcasting.

However, in case of streaming through the Internet, increment and decrement can be controlled differently. For example, the counter length of the run counter 743 may be decreased as much as 2N and the counter length of skip counter 741 may be increased as much as 1N.

When the buffer counter 850 is embodied as a double counter or a multiple counter as shown in FIG. 8, an amount of packets transferred to the encryption processor 420 can be controlled according to the available capacity of the buffer counter. Therefore, packet loss in the encryption process can be reduced.

As described above, if the recording apparatus and method in accordance with the embodiments of the present invention has compatibility to a typical encryption standard and a typical encryption module used in an existing broadcasting standard can be used. Further, a comparability can be maintained even at a device employing a hardware (HW) encryption module.

The recording apparatus and method in accordance with the embodiments of the present invention can prevent packet loss in encryption when a broadcasting program is encoded and recorded in real time although the recording apparatus and method in accordance with the embodiments of the present invention is employed in a low performance STB or TV.

The recording apparatus and method in accordance with the embodiments of the present invention can control a security level of encryption.

A term of module used throughout the specification denotes a unit device that processes or performs a predetermined function or operation. Such a module may be embodied as hardware, software, or the combination thereof.

The recording apparatus and method in accordance with the embodiments of the present invention may be embodied as hardware, software, or the combination thereof. In hardware embodiment, a module used for recording a broadcasting program may be embodied as an application specific integrated circuit (ASIC), a digital signal processor (DSP), a digital signal processing device (DSPD), a programmable logic device (PLD), a field programmable gate array (FPGA), a processor, a controller, a micro-controller, a microprocessor, an electric device designed to perform the above described functions, and the combination thereof. Software embodiment may be embodied through a module performing the above described function. Software codes may be stored in memory units and may be performed by a processor. The memory unit may be embodied in a processor internally or externally. In this case, the memory unit may be connected to the processor through various methods.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

What is claimed is:

1. An apparatus for encrypting and recording a broadcasting program, comprising:
   a packet input unit configured to receive packets of a broadcasting program to be recorded and sequentially output the packets;
   an encryption selector configured to receive the packets sequentially output from the packet input unit, selectively output the received packets to a first path and to a second path, wherein packets to be encrypted are outputted to the first path and packets not to be encrypted are outputted to the second path;
   an encryption processor configured to encrypt the packets outputted to the first path based on a predetermined encryption method; and
   a storing unit configured to store the encrypted packets from the encryption processor or store the packets outputted to the second path,
   wherein, when one path of the first path and the second path overflows, the encryption selector outputs the received packets to a non-overflow path.

2. The apparatus of claim 1, wherein the encryption selector includes a skip counter configured to have a predetermined counter length and to count packets outputted to the second path, and
   wherein the encryption selector outputs the packet to be encrypted to the first path and outputs a plurality of packets followed by the packet to be encrypted to the second path until the skip counter overflows.

3. The apparatus of claim 2, wherein the encryption selector resets the skip counter when the skip counter overflows, and outputs a next packet followed by the plurality of packets to the first path.

4. The apparatus of claim 2, further comprising a buffer counter configured to have a predetermined counter length, to counts packets stored in an input buffer before the packets are encrypted by the encryption processor, to have an upper threshold value and a low threshold value according to a number of the packets stored in the input buffer, and to control a counter length of the skip counter.

5. The apparatus of claim 4, wherein the buffer counter increases a counter length of the skip counter when the number of packets stored in the input buffer reaches to the upper threshold value, and
   wherein the buffer counter restores the counter length of the skip counter to an initial counter length when the number of packets stored in the input buffer reaches to the lower threshold value.

6. The apparatus of claim 4, wherein the buffer counter is one of a double counter and a multiple counter.

7. The apparatus of claim 1, wherein the encryption selector further includes:
   a run counter configured to have a predetermined counter length and count packets output to the first path; and
   a skip counter configured to have a predetermined counter length and count packets output to the second path,
   wherein the encryption selector outputs a plurality of target packets to be encrypted to the first path until the run counter overflows and outputs a plurality of packets followed by the target packets to the second path until the skip counter overflow.

8. The apparatus of claim 7, wherein the encryption selector resets the skip counter and outputs a plurality of packets followed by the target packets to the second path when the run counter overflows, and
   wherein the encryption selector resets the run counter and outputs a plurality of another target packets to be encrypted, which are followed by the plurality of packets, to the first path when the skip counter overflows.

9. The apparatus of claim 7, further comprising:
   a buffer counter configured to a predetermined counter length, to count packets stored in an input buffer before the packets encrypted by the encryption processor, to have an upper threshold value and a lower threshold value according to a number of packets stored in the input buffer, and to control counter lengths of the skip counter and the run counter.

10. The apparatus of claim 9, wherein the buffer counter increases the counter length of the skip counter and decreases the counter length of the run counter as much as increment of the counter length of the skip counter when the number of packets stored in the input buffer is equal to the upper threshold value, and
    wherein the buffer counter restores the counter lengths of the skip counter and the run counter to an initial counter length when the number of packets stored in the input buffer is equal to the lower threshold value.

11. A method for encrypting and recording a broadcasting program, comprising:
    receiving packets of a broadcasting program to be recorded;
    selectively outputting packets to be encrypted to a first path and packets not to be encrypted to a second path;
    encrypting the packets outputted to the first path based on a predetermined encryption method; and
    storing the encrypted packets and storing the packets outputted to the second path,
    wherein, when one path of the first path and the second path overflows, the received packets are outputted to a non-overflow path.

12. The method of claim 11, wherein said selectively outputting comprises:

outputting the packets to be encrypted to the first path and outputting a plurality of packets followed by the packets to be encrypted to the second path until a skip counter overflows; and counting the plurality of packets output to the second path in the skip counter.

13. The method of claim 12, wherein said selectively outputting comprises resetting the skip counter when the skip counter overflows and outputting a next packet followed by the plurality of packets to the first path.

14. The method of claim 12, further comprising, at a buffer counter, counting packets stored in an input buffer before the packets are encrypted.

15. The method of claim 14, wherein a counter length of the skip counter is increased if the number of packets stored in the input buffer is equal to an upper threshold value, and a counter length of the skip counter is restored to an initial counter length if the number of packets stored in the input buffer is equal to a lower threshold value.

16. The method of claim 14, wherein the buffer counter is one of a double counter and a multiple counter.

17. The method of claim 11, wherein, in said selectively outputting, the packets to be encrypted are output to the first path until the run counter overflows and a plurality of next packets followed by the packets to be encrypted to the second path until the skip counter overflows.

18. The method of claim 17, wherein said selectively outputting comprises:

resetting a skip counter when a run counter overflows and outputting a plurality of next packets followed by the packets to be encrypted to the second path, wherein the skip counter counts packets output to the second path and the run counter counts packets output to the first path; and resetting the run counter when the skip counter overflows and outputting a plurality of packets to be encrypted, which are followed by the plurality of next packets to the first path.

19. The method of claim 17, further comprising:

at a buffer counter, counting packets stored in an input buffer before the packets are encrypted; and controlling counter lengths of the skip counter and the run counter.

20. The method of claim 19, further comprising:

increasing the counter length of the skip counter when the number of packets stored in the input buffer reaches to an upper threshold value of the buffer counter and decreasing the counter length of the run counter as much as increment of the counter length of the skip counter; and restoring the counter lengths of the skip counter and the run counter to an initial counter length when the number of packets stored in the input buffer reaches to a lower threshold value of the buffer counter.

* * * * *